United States Patent
Aurongzeb et al.

(10) Patent No.: US 10,622,825 B2
(45) Date of Patent: Apr. 14, 2020

(54) DYNAMIC COIL AREA AND POWER ADJUSTMENT BASED ON DEVICE POSITION AND SENSOR FUSION FEEDBACK FROM SENSOR DEVICES

(71) Applicant: Dell Products L.P., Round Rock, TX (US)

(72) Inventors: Deeder M. Aurongzeb, Austin, TX (US); Timothy C. Shaw, Austin, TX (US); Benedict Tiong Chee Tay, Singapore (SG)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 15/636,176

(22) Filed: Jun. 28, 2017

(65) Prior Publication Data

US 2019/0006873 A1    Jan. 3, 2019

(51) Int. Cl.
| | | |
|---|---|---|
| *G06F 1/26* | (2006.01) | |
| *H02J 7/02* | (2016.01) | |
| *H02J 7/00* | (2006.01) | |
| *H02J 50/10* | (2016.01) | |
| *H01F 27/28* | (2006.01) | |
| *H02J 50/90* | (2016.01) | |
| *G06F 1/16* | (2006.01) | |

(52) U.S. Cl.
CPC ............ *H02J 7/025* (2013.01); *G06F 1/1632* (2013.01); *G06F 1/26* (2013.01); *H01F 27/28* (2013.01); *H02J 7/0021* (2013.01); *H02J 7/0042* (2013.01); *H02J 50/10* (2016.02); *H02J 50/90* (2016.02); *H02J 2007/0096* (2013.01)

(58) Field of Classification Search
None
See application file for complete search history.

(56) References Cited

U.S. PATENT DOCUMENTS

| | | |
|---|---|---|
| 8,796,989 B2 | 8/2014 | Lee et al. |
| 9,385,561 B2 | 7/2016 | Sayles |
| 2010/0244576 A1* | 9/2010 | Hillan ............. G06K 7/0008 307/104 |
| 2015/0162767 A1 | 6/2015 | Oh et al. |
| 2015/0333562 A1* | 11/2015 | Nam ............... H02J 7/0044 320/108 |
| 2016/0344244 A1 | 11/2016 | Li et al. |
| 2018/0269709 A1* | 9/2018 | White, II ............ H02J 7/025 |

* cited by examiner

*Primary Examiner* — Fahmida Rahman
(74) *Attorney, Agent, or Firm* — Baker Botts L.L.P.

(57) ABSTRACT

Systems and methods for dynamic coil area and power adjustment based on device position and sensor fusion feedback from touch, optical, Bluetooth, and specific absorption rate sensor devices may include a charging device that may include a first induction coil having an active length and a processor. The charging device may transmit power wirelessly to a portable device having a second induction coil by coupling the first induction coil and the second induction coil. The charging device may determine an adjusted active length of the first induction coil that may be based on a first charging efficiency of the first induction coil. The processor may electronically switch the active length of the first induction coil to the determined adjusted active length. The processor may transmit the power wirelessly to the portable device to charge a first battery of the portable device.

18 Claims, 12 Drawing Sheets

DYNAMIC COIL AREA AND POWER ADJUSTMENT BASED ON DEVICE POSITION AND SENSOR FUSION FEEDBACK FROM SENSOR DEVICES

BACKGROUND

Field of the Disclosure

This disclosure relates generally to information handling systems and, more particularly, to dynamic coil area and power adjustment based on device position and sensor fusion feedback from sensor devices.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and may utilize a charging device to wirelessly charge the rechargeable battery.

SUMMARY

In one aspect, a disclosed charging device may include a first induction coil having an active length and may transmit power wirelessly to a portable device having a second induction coil by coupling the first induction coil and the second induction coil. The active length may be adjustable. The charging device may also include a processor that may determine a first charging efficiency of the first induction coil. The processor may also determine an adjusted active length of the first induction coil that may be based on the determined first charging efficiency. The processor may further electronically switch the active length of the first induction coil to the determined adjusted active length. The processor may also transmit the power wirelessly from the first induction coil to the portable device to charge a first battery of the portable device.

In any of the disclosed embodiments of the charging device, the first induction coil may be a double wound coil including a first inner induction coil having a first length and a second inner induction coil having a second length. The processor may electronically switch the active length of the first induction coil by electronically switching between utilizing the first inner induction coil having the first length and utilizing the second inner induction coil having the second length.

In any of the disclosed embodiments of the charging device, the first induction coil may have a flat shape.

In any of the disclosed embodiments of the charging device, the first induction coil may have a convex shape so that the center of the first induction coil may be closer to a charging pad of the charging device than the perimeter of the first induction coil.

In any of the disclosed embodiments of the charging device, the first induction coil may be a three dimensional coil that may have a successive plurality of links that may include a first link. Each of the successive plurality of links may have a plurality of turns and an electrical connection to a next link in the succession of the plurality of links after the first link. The processor may electronically switch the active length of the first induction coil by electronically switching the electrical connection of the first link to disconnect the first link from the next link and may set the active length of first induction coil to a total length of the first link and all previous links in the succession of the plurality of links before the first link.

In any of the disclosed embodiments of the charging device, the charging device may also include one or more sensor devices that may detect the portable device in contact with the charging device. The processor may also detect the portable device using the one or more sensor devices. The one or more sensor devices may include at least one of a track sensor device, a proximity sensor device, a touch sensor device, an optical sensor device, a thermal sensor device, and a specific absorption rate sensor device.

In any of the disclosed embodiments of the charging device, the processor may determine that a second battery of the portable device may be charged based on battery information of the portable device received from the portable device. The processor may also determine a second charging efficiency of the first induction coil to charge the second battery. The processor may further determine a second adjusted active length of the first induction coil based on the determined second charging efficiency. The processor may also electronically switch the active length of the first induction coil to the determined second adjusted active length. The processor may further transmit the power wirelessly to the portable device to charge the second battery by coupling the first induction coil and a third induction coil of the portable device to transmit power wirelessly to the portable device.

In any of the disclosed embodiments of the charging device, the processor may also determine a relative distance between a first charging surface of the charging device and a second charging surface of the portable device. The processor may further determine a position of the portable device on the first charging surface. The processor may also determine a temperature of the first induction coil. The processor may further determine an angle of the second charging surface of the portable device to the first charging surface. The processor may also determine proximity of the second charging surface of the portable device to the first charging surface. The processor may further determine a loss of the charging efficiency of the charging device that may be based on the relative distance between the first charging surface and the second charging surface, the position of the portable device on the first charging surface, the temperature of the first induction coil, the angle of the second charging surface to the first charging surface, the proximity of the second charging surface to the first charging surface, battery information of the portable device received from the portable device, and an eddy current of the first induction coil.

In any of the disclosed embodiments of the charging device, the battery information of the portable device may include at least one of a battery charging priority, a charge level of the first battery, a charging efficiency of the first battery, a health of the first battery, a temperature of the first battery, a usage level of the first battery, a charge level of a second battery of the portable device, a charging efficiency of the second battery, a health of the second battery, a temperature of the second battery, and a usage level of the second battery.

In any of the disclosed embodiments of the charging device, the first charging efficiency of the first induction coil may be based on at least one of a relative position of the second induction coil of the portable device to the first induction coil of the charging device, a relative distance between the first charging surface and a second charging surface of the portable device, an angle of the second charging surface of the portable device to the first charging surface, a proximity of the second charging surface of the portable device to the first charging surface, a temperature of the first induction coil, and an eddy current of the first induction coil.

In another aspect, a disclosed method may include determining, by a processor of a charging device, a first charging efficiency of a first induction coil of the charging device having an active length. The active length of the first induction coil may be adjustable. The method may also include determining, by the processor, an adjusted active length of the first induction coil that may be based on the determined first charging efficiency. The method may further include electronically switching, by the processor, the active length of the first induction coil to the determined adjusted active length. The method may also include transmitting, by the processor, power wirelessly from the first induction coil of the charging device to the portable device having a second induction coil to charge a first battery of the portable device. The power may be transmitted wirelessly by coupling the first induction coil of the charging device and the second induction coil of the portable device.

In any of the disclosed embodiments of the method, the first induction coil may be a double wound coil including a first inner induction coil having a first length and a second inner induction coil having a second length. The processor may electronically switch the active length of the first induction coil by electronically switching between utilizing the first inner induction coil having the first length and utilizing the second inner induction coil having the second length.

In any of the disclosed embodiments of the method, the first induction coil may have a flat shape.

In any of the disclosed embodiments of the method, the first induction coil may have a convex shape so that the center of the first induction coil may be closer to a charging pad of the charging device than the perimeter of the first induction coil.

In any of the disclosed embodiments of the method, the first induction coil may be a three dimensional coil having a successive plurality of links that may include a first link. Each of the successive plurality of links may have a plurality of turns and an electrical connection to a next link in the succession of the plurality of links after the first link. The processor may electronically switch the active length of the first induction coil by electronically switching the electrical connection of the first link to disconnect the first link from the next link. The processor may also set the active length of first induction coil to a total length of the first link and all previous links in the succession of the plurality of links before the first link.

In any of the disclosed embodiments of the method, the method may also include detecting the portable device in contact with the charging device using one or more sensor devices of the charging device. The one or more sensor devices may include at least one of a track sensor device, a proximity sensor device, a touch sensor device, an optical sensor device, a thermal sensor device, and a specific absorption rate sensor device.

In any of the disclosed embodiments of the method, the method may also include determining that a second battery of the portable device may be charged based on battery information of the portable device received from the portable device. The method may further include determining a second charging efficiency of the first induction coil to charge the second battery. The method may also include determining a second adjusted active length of the first induction coil that may be based on the determined second charging efficiency. The method may further include electronically switching the active length of the first induction coil to the determined second adjusted active length. The method may also include transmitting the power wirelessly from the charging device to the portable device to charge the second battery. The power may be transmitted wirelessly by coupling the first induction coil of the charging device and a third induction coil of the portable device.

In any of the disclosed embodiments of the method, the method may also include determining a relative distance between a first charging surface of the charging device and a second charging surface of the portable device. The method may further include determining a position of the portable device on the first charging surface. The method may also include determining a temperature of the first induction coil. The method may further include determining an angle of the second charging surface of the portable device to the first charging surface. The method may also include determining proximity of the second charging surface of the portable device to the first charging surface. The method may further include determining a loss of the charging efficiency of the charging device that may be based on the relative distance between the first charging surface and the second charging surface, the position of the portable device on the first charging surface, the temperature of the first induction coil, the angle of the second charging surface to the first charging surface, the proximity of the second charging surface to the first charging surface, battery information of the portable device received from the portable device, and an eddy current of the first induction coil.

In any of the disclosed embodiments of the method, the battery information of the portable device may include at least one of a battery charging priority, a charge level of the first battery, a charging efficiency of the first battery, a health of the first battery, a temperature of the first battery, a usage level of the first battery, a charge level of a second battery of the portable device, a charging efficiency of the second battery, a health of the second battery, a temperature of the second battery, and a usage level of the second battery.

In any of the disclosed embodiments of the method, the first charging efficiency of the first induction coil may be based on at least one of a relative position of the second induction coil of the portable device to the first induction coil of the charging device, a relative distance between the first charging surface and a second charging surface of the portable device, an angle of the second charging surface of the portable device to the first charging surface, a proximity of the second charging surface of the portable device to the first charging surface, a temperature of the first induction coil, and an eddy current of the first induction coil.

BRIEF DESCRIPTION OF THE DRAWINGS

For a more complete understanding of the present invention and its features and advantages, reference is now made to the following description, taken in conjunction with the accompanying drawings, in which.

DESCRIPTION

Figure 1:
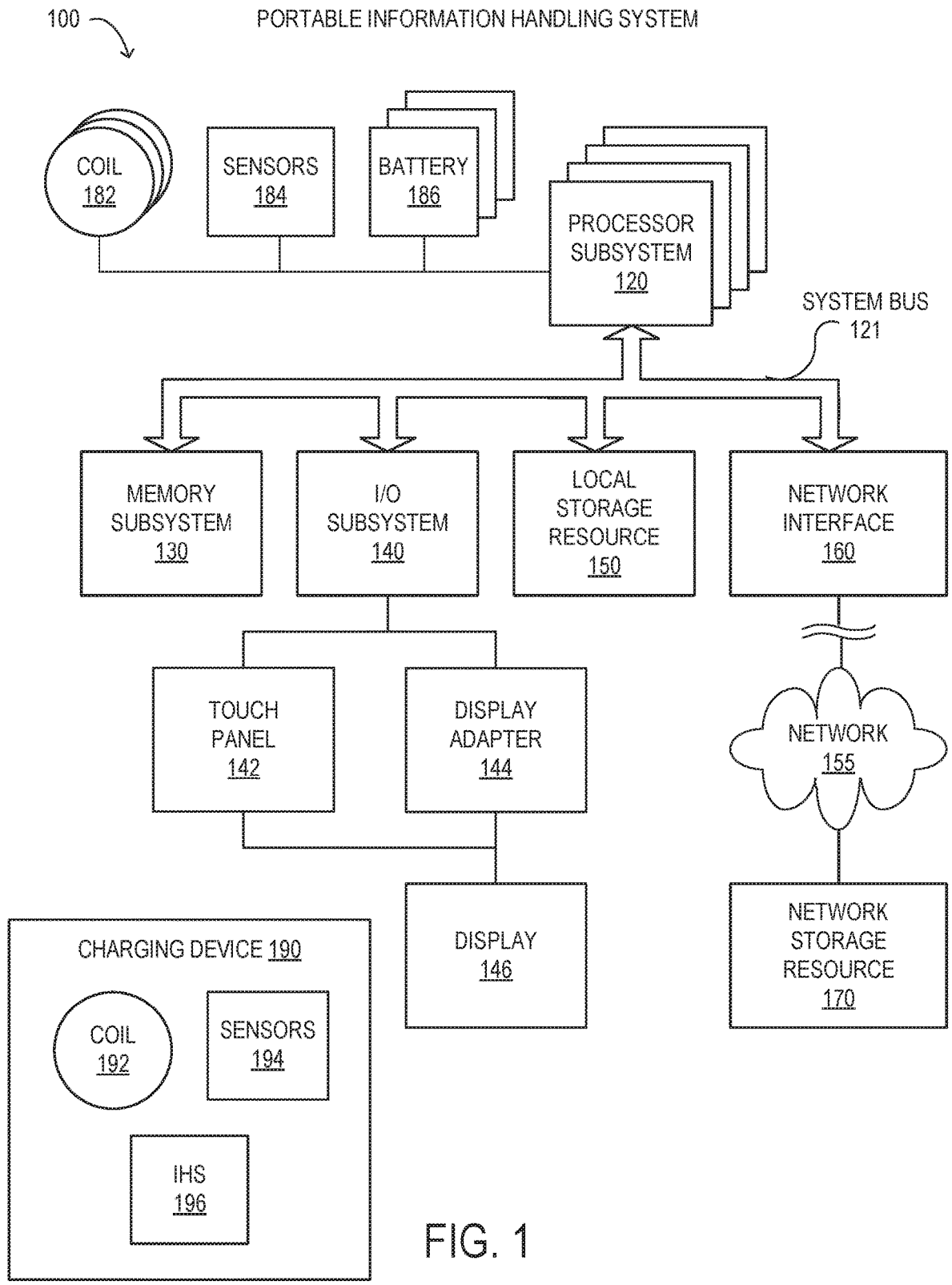
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1-11 wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory subsystem 130, an I/O subsystem 140, a local storage resource 150, and a network interface 160. Also shown within information handling system 100 is one or more induction coils 182 for wireless power reception and transfer, one or more sensors 184, and one or more batteries 186 to provide power to portable information handling system 100 or one or more components of portable information handling system 100. Further-more, portable information handling system 100 may be inductively coupled to a charging device 190 that incorporates various high efficiency features for use with portable information handling system 100, as disclosed herein. As shown, charging device 190 may be an external device to portable information handling system 100 which may be utilized to wirelessly charge the one or more batteries 186 of portable information handling system 100, as described in further detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating. As shown, I/O subsystem 140 may comprise touch panel 142 and display adapter 144. Touch panel 142 may include circuitry for enabling touch functionality in conjunction with a display 146 that is driven by display adapter 144.

Sensors 184 may be one or more sensor devices that may include a thermal sensor device, an eddy current sensor device to provide eddy current information coils 182, a battery monitoring device to provide battery information of the one or more batteries 186, and a wireless communication device to communicate with a charging device, among other types of sensor devices. The battery information of the one or more batteries 186 may include a battery charging priority, a charge level of a battery, a charging efficiency of a battery, a health of a battery, a temperature of a battery, and a usage level of a battery, among other types of battery information. A wireless communication device may be a Bluetooth device, an infrared device, a near field communication device, a Zigbee device, among other types of wireless communication devices. A processor of processor subsystem 120 of portable information handling system 100 may collect sensor feedback information from the one or more sensor devices of sensors 184 and provide the sensor feedback of portable information handling system 100 to charging device 190 via the wireless communication device, described in more detail below. Battery 186 may be a smart battery that may monitor battery charge levels, battery efficiency, and battery charging efficiency, among other battery characteristics. A portable information handling system may also be referred herein as a portable device.

Charging device 190 may include an induction coil 192, one or more sensor devices 194, and an information handling system 196. Information handling system 196 may have similar components, functionality and structure as information handling system 100.

As will be described in further detail herein, a portable information handling system, may utilize charging devices to wirelessly transfer power from a charging device to the portable information handling system through electromagnetic inductive coupling of an induction coil of the charging device and an induction coil of the portable information handling system when the portable information handling system is on or near a first charging surface of the charging device, which may be used to charge one or more batteries of the portable information handling system. Typical charging devices convert a voltage of a power supply into a high frequency alternating current (AC) that is sent to a transmitter induction coil of the charging device by a transmitter circuit. The AC current induces a time varying magnetic field in the transmitter induction coil. The AC current flowing within the transmitter induction coil induces a magnetic field which extends to a receiver induction coil of the portable information handling system when the portable information handling system is on or near a first charging surface of the charging device. The magnetic field generates an AC current within the receiver induction coil of the portable information handling system. The power transmitted between the transmitter and receiver induction coils are also referred herein as magnetic or resonant coupling and may be achieved by both induction coils resonating at the same frequency. The AC current flowing within the receiver induction coil is converted into direct current (DC) by a receiver circuit, which may be used to charge a battery.

The charging device may transmit power wirelessly to the portable information handling system by coupling the transmitter induction coil of the charging device and the receiver induction coil of the portable information handling system. The transmitter induction coil generates an induced electromagnetic field (EMF) into the adjacent receiver induction coil of the portable information handling system by mutual induction (M). As such, transmitter induction coil and the receiver induction coil are magnetically linked together by a common magnetic flux and will have the property of mutual inductance, which may be defined as the current flowing in one coil that induces a voltage in an adjacent coil. The charging efficiency of the charging device may depend on the amount of mutual inductance between the two induction coils.

The amount of mutual inductance that links the transmitter induction coil to the adjacent receiver induction coil and the charging efficiency of the charging device may depend on the axial alignment and the relative positioning of the two induction coils. When the adjacent receiver induction coil may be positioned next to the transmitter induction coil so that their physical distance apart may be small and the two coils may be axially aligned, then nearly all of the magnetic flux generated by the transmitter induction coil may interact with the coil turns of the receiver induction coil that may induce a relatively large EMF and therefore may produce a large mutual inductance value, which may result in a higher charging efficiency of the charging device.

When the transmitter induction coil and the adjacent receiver induction coil may be farther apart from each other, may be at different angles relative to each other, or may be axially misaligned, the amount of induced magnetic flux from the transmitter induction coil into the adjacent receiver induction coil may be weaker and may produce a smaller induced EMF and therefore a smaller mutual inductance value, which may result in a lower charging efficiency of the charging device. So the effect of mutual inductance and the charging efficiency may be very dependent upon the relative positions of the two induction coils and the axial alignment of the two induction coils.

The charging speed and efficiency of the charging device may depend on the position of the portable information handling system on the first charging surface of the charging device and, in particular, the alignment and the position of the transmitter induction coil of the charging device relative to the position of the receiver induction coil. The charging speed and efficiency may also be dependent on the size of the transmitter induction coil and the size of the receiver induction coil. When the positions of the transmitter and receiver induction coils are misaligned, the charging speed and efficiency of the charging device may be reduced. A smaller transmitter induction coil that is misaligned may further reduce the charging speed and efficiency of the charging device.

Therefore, a charging device, for example, charging device 190 that may dynamically adjust the length of a transmitter induction coil and thereby increase a coil charging area, may increase the charging speed and efficiency of the charging device when the transmitter induction coil of charging device 190 and the receive induction coil 182 of portable information handling system 100 are misaligned. The increased coil charging area may provide a larger overlap between induction coils 182 and 192 that may result in the increased charging speed and efficiency of charging device 190. Information handling system 196 of charging device 190 may also utilize sensor feedback from sensors 184 of portable information handling system 100 and sensors 194 of charging device 190 to further increase and optimize the charging speed and efficiency based on context.

Figure 2:
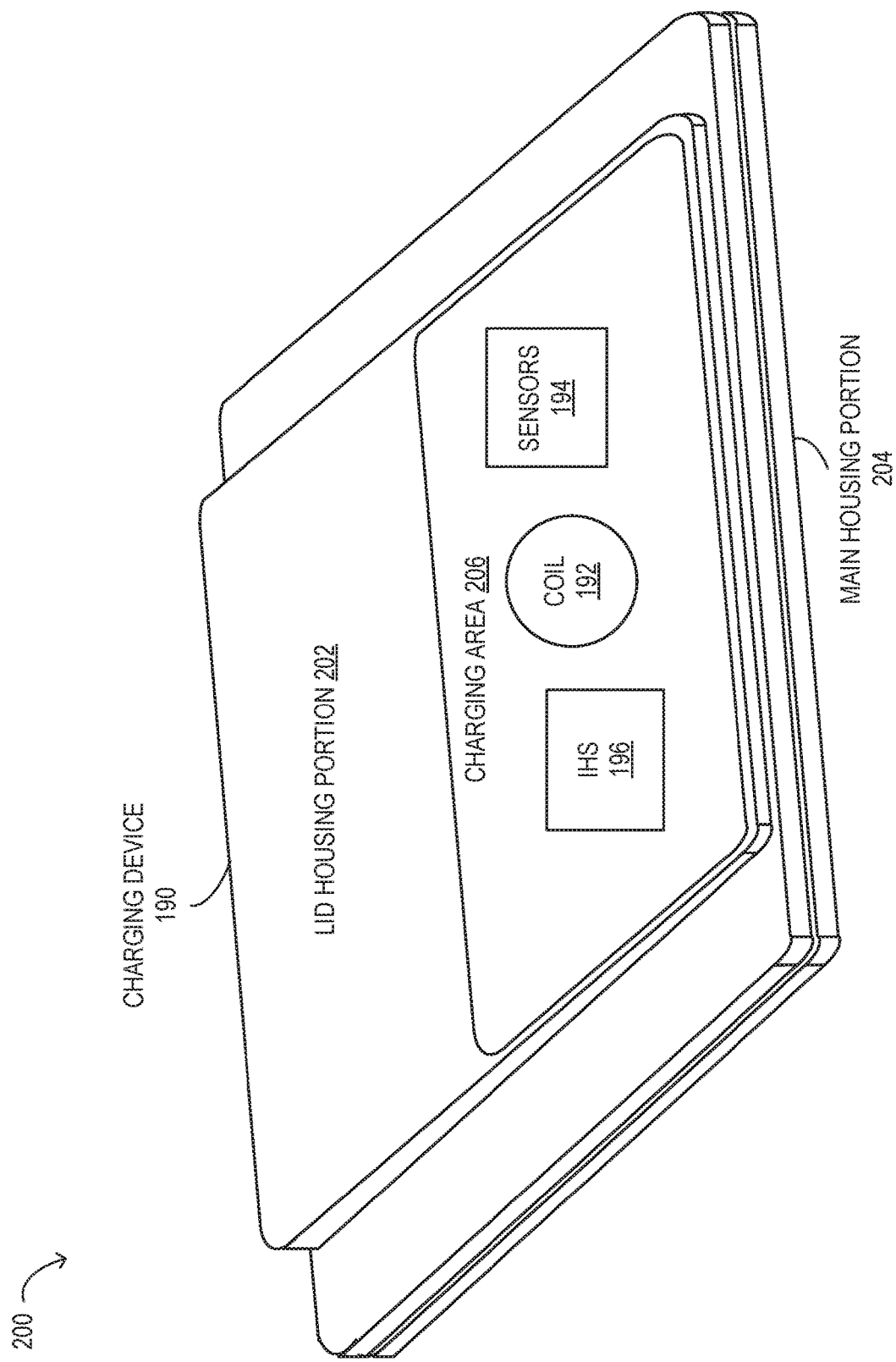
FIG. 2 is a perspective view of selected elements of an embodiment of a charging device.

Turning now to FIG. 2, is a perspective view 200 of a block diagram of selected elements of an embodiment of charging device 190. In FIG. 2, charging device 190 is shown in a schematic representation and is not drawn to scale or perspective. It is noted that, in different embodiments, charging device 190 may be operated with additional or fewer elements.

As shown in FIG. 2, components of charging device 190 may include, but are not limited to, a lid housing portion 202 having a charging area 206, and a main housing portion 204. Information handling system 196 may incorporate various high efficiency features for use with portable information handling system 100, as disclosed herein. Induction coil 192 may be included in lid housing portion 202, main housing portion 204, or a combination of both. Charging area 206 may be an external surface of lid housing portion 202, which may be a charging mat, a charging pad, a charging plate, and other types of charging surfaces. A processor of processor subsystem 120 of information handling system 196 may detect a portable information housing system, e.g. portable handling system 100, in contact with charging device 190 using one or more sensor devices of sensors 194 of charging device 190. Sensors 194 may include a track sensor device, a proximity sensor device, a touch sensor device, an optical sensor device, a thermal sensor device, a specific absorption rate sensor device, an eddy current sensor device, and a wireless communication device, among other types of sensor devices. A wireless communication device may be a Bluetooth device, an infrared device, a near field communication device, a Zigbee device, among other types of wireless communication devices. Sensors 194 may be included in charging area 206, lid housing portion 202, main housing portion 204, or any combination of all three. The processor of charging device 190 may also collect sensor feedback information from the one or more sensor devices of sensors 194, discussed in further detail below.

Figure 3:
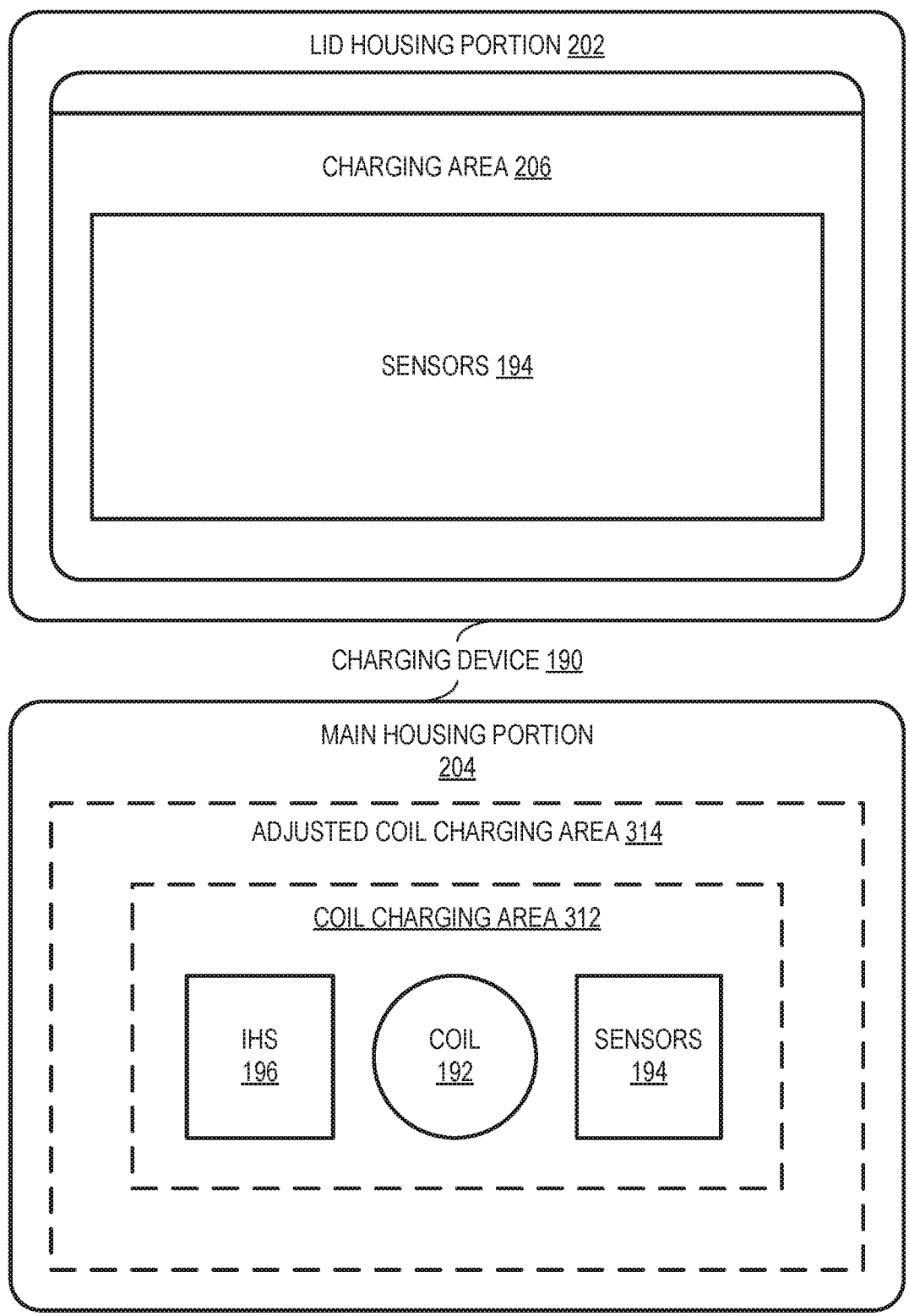
FIG. 3 is a block diagram of selected elements of an embodiment of a charging device.

Turning now to FIG. 3, is a block diagram of selected elements of an embodiment of charging device 190. In FIG. 3, charging device 190 is shown in a schematic representation and is not drawn to scale or perspective. It is noted that, in different embodiments, charging device 190 may be operated with additional or fewer elements.

As shown in FIG. 3, main housing portion 204 may include a coil charging area 312 and an adjusted coil charging area 314. Charging device 190 may transmit power wirelessly to a portable device, for example, portable information handling system 100 by coupling induction coil 192 and a second induction coil of the portable device, e.g., induction coil 182 of portable information handling system 100.

During operation, the processor of charging device 190 may detect portable device 100 in contact with charging device 190 using the one or more sensor devices of sensors 194 of charging device 190. In response to detecting portable device 100, the processor of charging device 190 may determine a first charging efficiency of induction coil 192 by collecting sensor information from one or more sensor devices of sensors 194 of charging device 190. The processor of charging device 190 may also send a sensor feedback request to portable device 100 using the wireless communication device of charging system 190. Based on the sensor feedback request from charging device 190, portable device 100 may collect sensor feedback information from the one or more sensor devices of sensors 184 and send the sensor feedback information of portable device 100 to charging device 190.

The processor of charging device 190 may use the sensor feedback information of charging device 190 and the sensor feedback information of portable device 100 to determine a relative distance between the first charging surface of charging device 190 and the second charging surface of portable device 100. The processor of charging device 190 may further determine a position of portable device 100 on the first charging surface of charging device 190. The processor of charging device 190 may also determine temperatures of induction coil 182 of portable device 100 and induction coil 192 of charging device 190. The processor of charging device 190 may further determine an angle of the second charging surface of portable device 100 to the first charging surface of charging device 190. The processor of charging device 190 may also determine proximity of the second charging surface of the portable device 100 to the first charging surface of charging device 190. The processor of charging device 190 may further determine a loss of the charging efficiency of charging device 190 that may be based on the relative distance between the first charging surface of charging device 190 and the second charging surface of portable device 100, the position of portable device 100 on the first charging surface of charging device 190, the temperature of induction coil 182, the temperature of induction coil 192, the angle of the second charging surface of portable device 100 to the first charging surface of charging device 190, the proximity of the second charging surface of portable device 100 to the first charging surface of charging device 190, battery information of portable device 100 received from portable device 100, an eddy current of induction coil 182, and an eddy current of induction coil 192.

The processor may also determine an adjusted active length of induction coil 192 that may be based on the determined first charging efficiency. The processor may further electronically switch the active length of the first induction coil to the determined adjusted active length. The processor may also transmit the power wirelessly from the first induction coil to the portable device to charge a first battery of the portable device.

Figure 4:
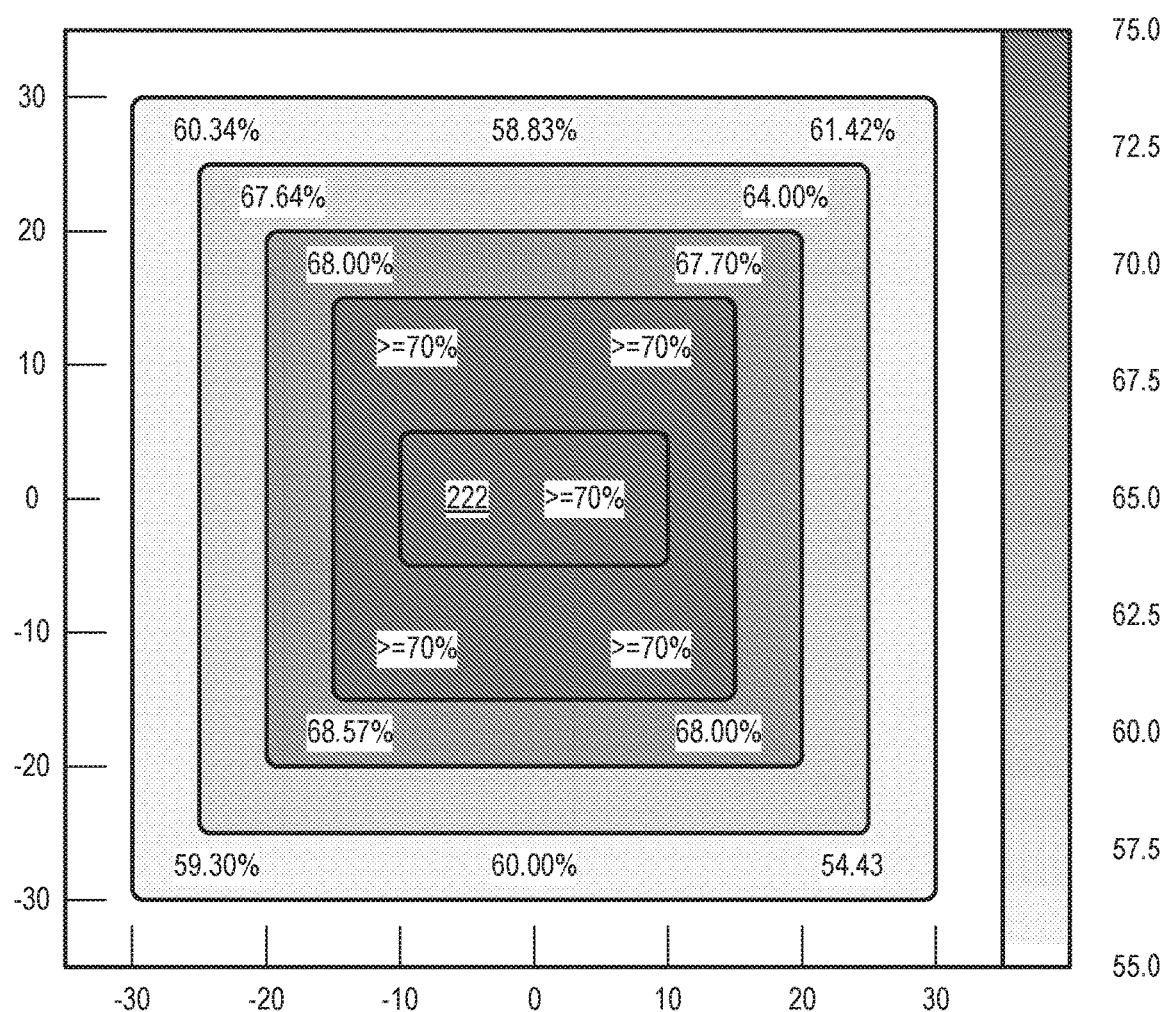
FIG. 4 is a chart of end-to-end charging efficiency percentage (%) based on a position of a portable device relative to a charging device.

FIG. 4 shows a chart 400 of end-to-end charging efficiency percentage (%) based on a position of a portable device relative to a charging device. The two frequencies are known as electric resonance (fe) and magnetic resonance (fm) frequencies. As shown in chart 400, both of these frequencies vary with the coupling coefficient. The total mutual inductance (Mtot) between two multi-turn induction coils may be given as:

$$Mtot = \sum_{i=1}^{Nt} \sum_{j=1}^{Nr} Mij$$

Mtot may be changed by changing the active length of a multi-turn induction coil (also referred herein as the effective length) and by changing the parasitic capacitance of a multi-turn induction coil. The mutual inductance that exists between induction coil 192 and the second induction coil may be increased by increasing the number of turns of induction coil 192, which may result in an increased charging efficiency of charging device 190. Induction coil 192 may have an active length that may be adjusted by charging device 190, described in greater detail below.

Referring back to FIG. 3, charging device 190 may have a coil charging area 312 as an active coil charging area when induction coil 192 has a first active length. When charging device 190 adjusts the active length of induction coil 192 to be greater than the first active length, charging device 190 may have an adjusted coil charging area 314 as the active coil charging area, where adjusted coil charging area 314 is larger than coil charging area 312.

Figure 5:
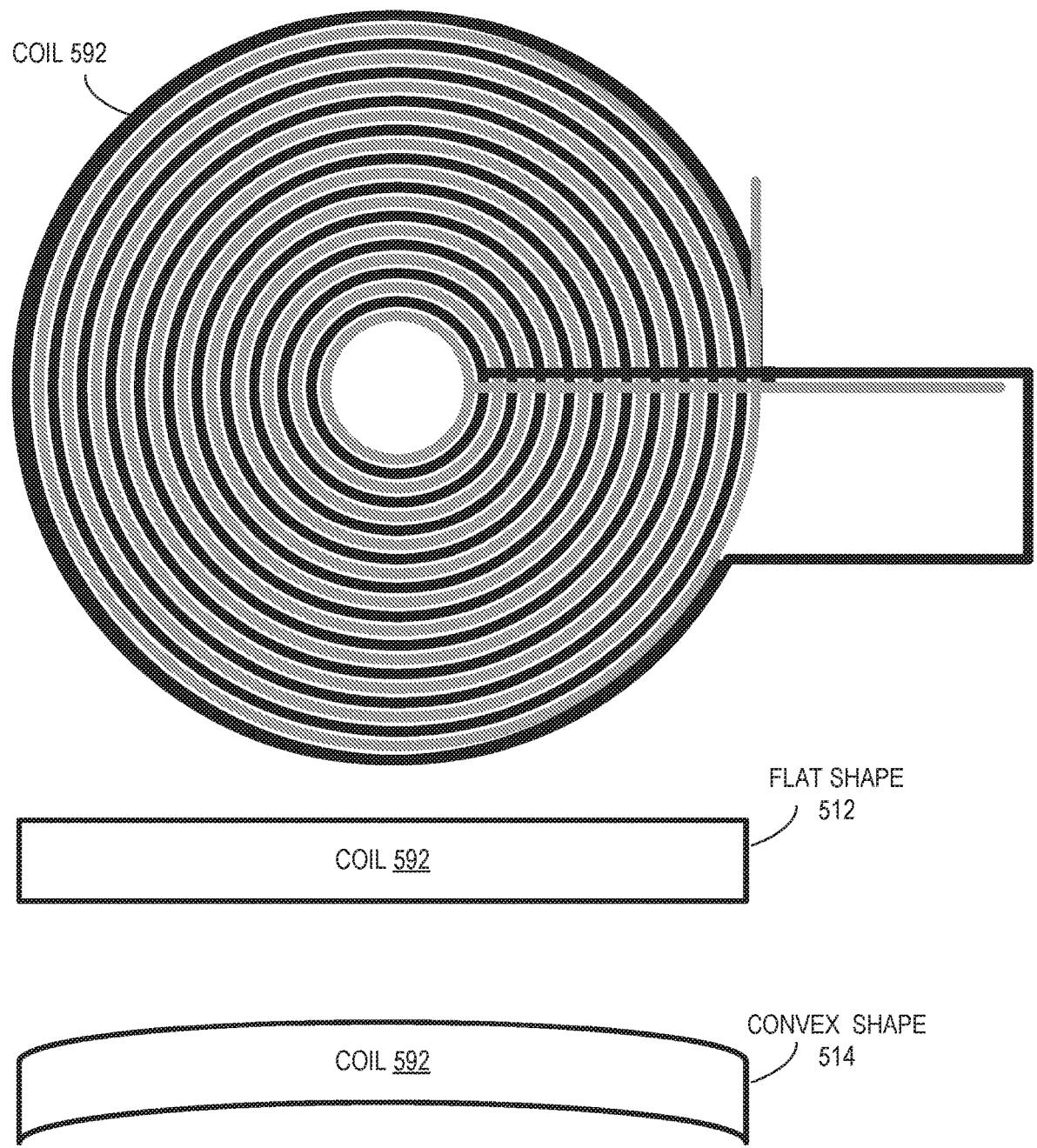
FIG. 5 is a block diagram of selected elements of an embodiment of a double wound coil for wireless power transmission.
Figure 6:
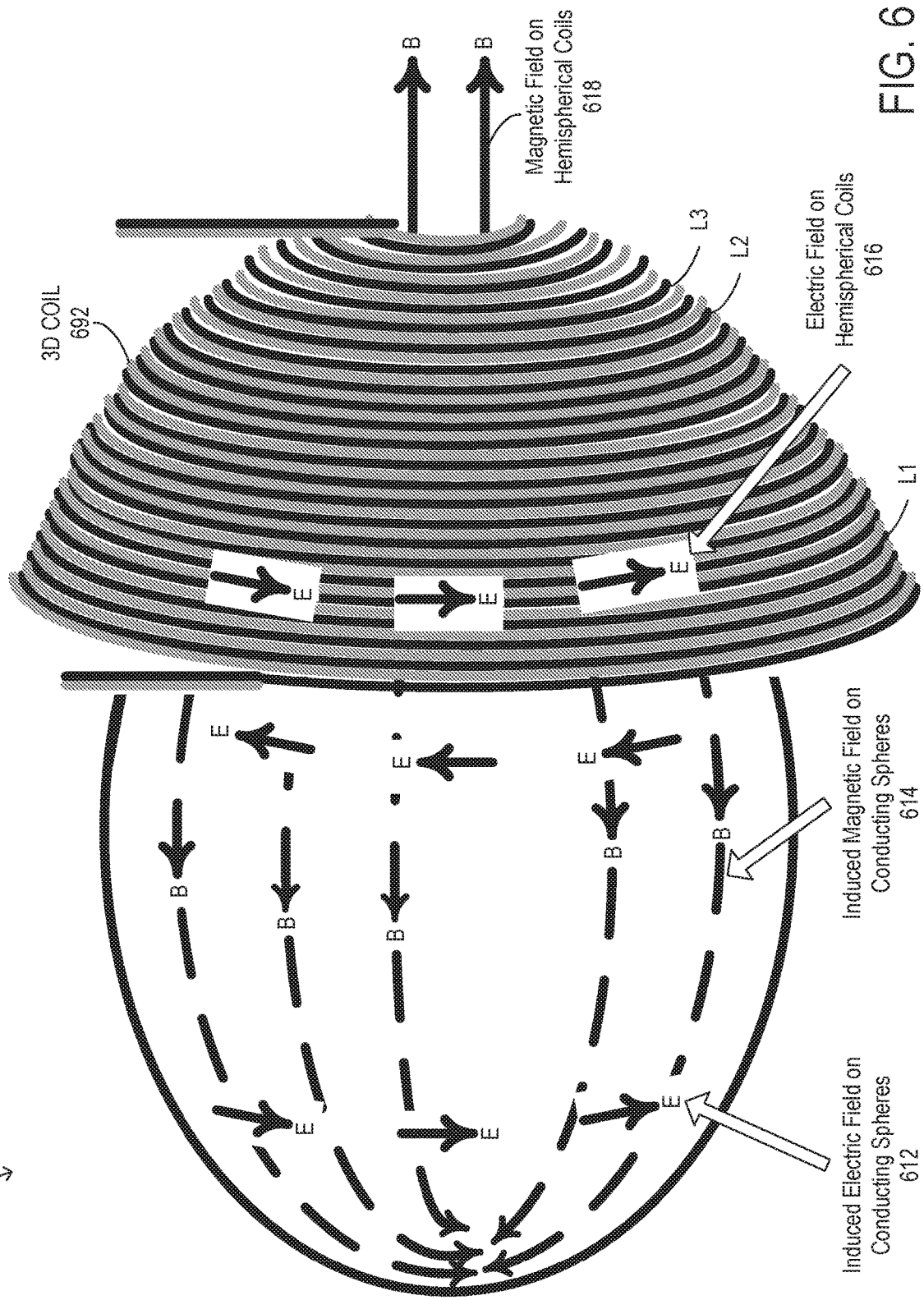
FIG. 6 is a block diagram of selected elements of an embodiment of a three dimensional (3D) coil for angle offset wireless power transmission.

As described above, to account for altering resonance frequency between charging device 190 and the portable device and a positioning offset of the relative position of the portable device to the position of charging device 190, the active length of induction coil 192 may be increased or decreased through an electrical switching circuit of charging device 190 to add or remove the number of turns in induction coil 192. Adjusting the number of turns in induction coil 192 may provide frequency adjustments and may allow for a greater range of operation of induction coil 192. Adjusting the active coil charging area to adjusted coil charging area 314 may increase the overlap area between induction coil 192 and the second induction coil of the portable device, which may result in an increase in mutual inductance between the two induction coils and an increase in the charging efficiency of charging device 190. This may also compensate for device misalignment when charging device 190 and the portable device are misaligned, though the resulting increase in charging efficiency may still be less than the charging efficiency achieved when charging device 190 and the portable device are properly aligned. FIGS. 5 and 6 describe two different embodiments of induction coil 192.

Turning now to FIG. 5, is a block diagram of selected elements of an embodiment of a double wound induction coil 592 for wireless power transmission. In FIG. 5, double wound induction coil 592 is shown in a schematic representation and is not drawn to scale or perspective. It is noted that, in different embodiments, double wound induction coil 592 may be operated with additional or fewer elements.

As shown in FIG. 5, double wound induction coil 592 may be an embodiment of induction coil 192 of charging device 190. Double wound induction coil 592 may have an active length and a shape. Double wound induction coil 592 may include two inner induction coils including a first inner induction coil and a second inner induction coil and an electrical switch circuit. The first inner induction coil may include a first input, a first output, and a first length, the first input and the first output coupled to the electrical switching circuit. The second inner induction coil may include a second input, a second output, and a second length, the second input and the second output coupled to the electrical switching circuit. The second length of the second induction coil may be greater than the first length of the first induction coil.

A processor of charging device 190 may electronically switch the active length of double wound induction coil 592 by electronically switching between utilizing the first inner induction coil having the first length and utilizing the second inner induction coil having the second length. During operation, the processor may utilize the electrical switching circuit to connect the first input and the first output of the first inner induction coil to a power supply providing an alternating current. The active coil charging area of charging device 190 may be coil charging area 312 and the active length of double wound induction coil 592 may be the first length of the first inner induction coil when coupling with induction coil 182 of portable information handling system 100.

Similarly, the processor may utilize the electrical switching circuit to connect the second input and the second output of the second inner induction coil to the power supply providing the alternating current. The active coil charging area of charging device 190 may be adjusted coil charging area 314 and the active length of double wound induction coil 592 may be the second length of the second inner induction coil when coupling with induction coil 182 of portable information handling system 100.

The shape of double wound induction coil 592 may also improve the charging speed and efficiency based on the relative position and angle of portable information handling system 100 when placed on charging device 190. In one or more embodiments, double wound induction coil 592 may have a flat shape 512. Flat shape 512 of double wound induction coil 592 may allow improved coupling when portable information handling system 100 is placed on charging device 190 in a flat position having a zero degree (0°) angle relative to charging device 190. In one or more embodiments, double wound induction coil 592 may have a convex shape 514 so that the center of double wound induction coil 592 may be closer to a charging pad of charging device 190 than the perimeter of double wound induction coil 592. Convex shape 514 of double wound induction coil 592 may allow improved coupling when portable information handling system 100 is placed on charging device 190 in an angled position greater than 0° or has a gap between portable information handling system 100 and charging device 190, described in further detail below with respect to FIGS. 7A and 7B.

Turning now to FIG. 6, is a block diagram of selected elements of an embodiment of a three dimensional (3D) induction coil 692 for angle offset wireless power transmission 800. In FIG. 6, 3D induction coil 692 is shown in a schematic representation and is not drawn to scale or perspective. It is noted that, in different embodiments, 3D induction coil 692 may be operated with additional or fewer elements.

As shown in FIG. 6, 3D induction coil 692 may be an embodiment of induction coil 192 of charging device 190. 3D induction coil 692 may have an active length and a shape. 3D induction coil 692 may include a successive plurality of links of induction coil including a start link, a first link, and an end link. Each of the successive plurality of links may have a plurality of turns and an electrical connection to a next link in the succession of the plurality of links after the first link.

The E arrows show the direction of an electric field on hemispherical coils 816 of 3D induction coil 692 and the B arrows show a magnetic field on hemispherical coils 818 flowing in a direction that is perpendicular to the E arrows. The E arrows and the B arrows also show the direction of an induced electrical field on conducting spheres 812 and the direction of an induced magnetic field on conducting spheres 814.

The hemispherical shape of 3D induction coil 692 may improve the charging speed and efficiency based on the relative position and angle of portable information handling system 100 when placed on charging device 190. The top of the hemisphere may be closer to a charging pad of charging device 190 and may allow improved coupling when portable information handling system 100 is placed on charging device 190 in an angled position greater than 0° or has a gap between portable information handling system 100 and charging device 190.

During operation, the processor of charging device 190 may electronically switch the active length of 3D induction coil 692 by electronically switching the electrical connection of the first link to disconnect the first link from the next link and may set the active length of 3D induction coil 692 to a total length of the first link and all previous links in the succession of the plurality of links before the first link. The total number of active turns in 3D induction cable 692 may be equal to the number of turns in each of the links up to and including the first link. The alternating current provided by the power supply flows through the active links of 3D induction cable 692 from the start link through the first link of 3D induction coil 692. When the first link is the end link, the active length may be the total length of the 3D induction cable 692 and the active number of turns may be the total number of turns of the 3D induction cable 692.

When the processor adjusts the active length and the active number of turns of 3D induction cable 692, the charging speed and efficiency of charging device 190 may also be adjusted. For example, when the processor adjusts the active length to length L1, the active coil charging area of charging device 190 may be coil charging area 312 when coupling 3D induction cable 692 with induction coil 182 of portable information handling system 100. Similarly, when the processor adjusts the active length to length L2, the active coil charging area of charging device 190 may be adjusted coil charging area 314 when coupling 3D induction cable 692 with induction coil 182, where L2 is greater than L1, described in further detail below with respect to FIGS. 7A and 7B.

Figure 7A:
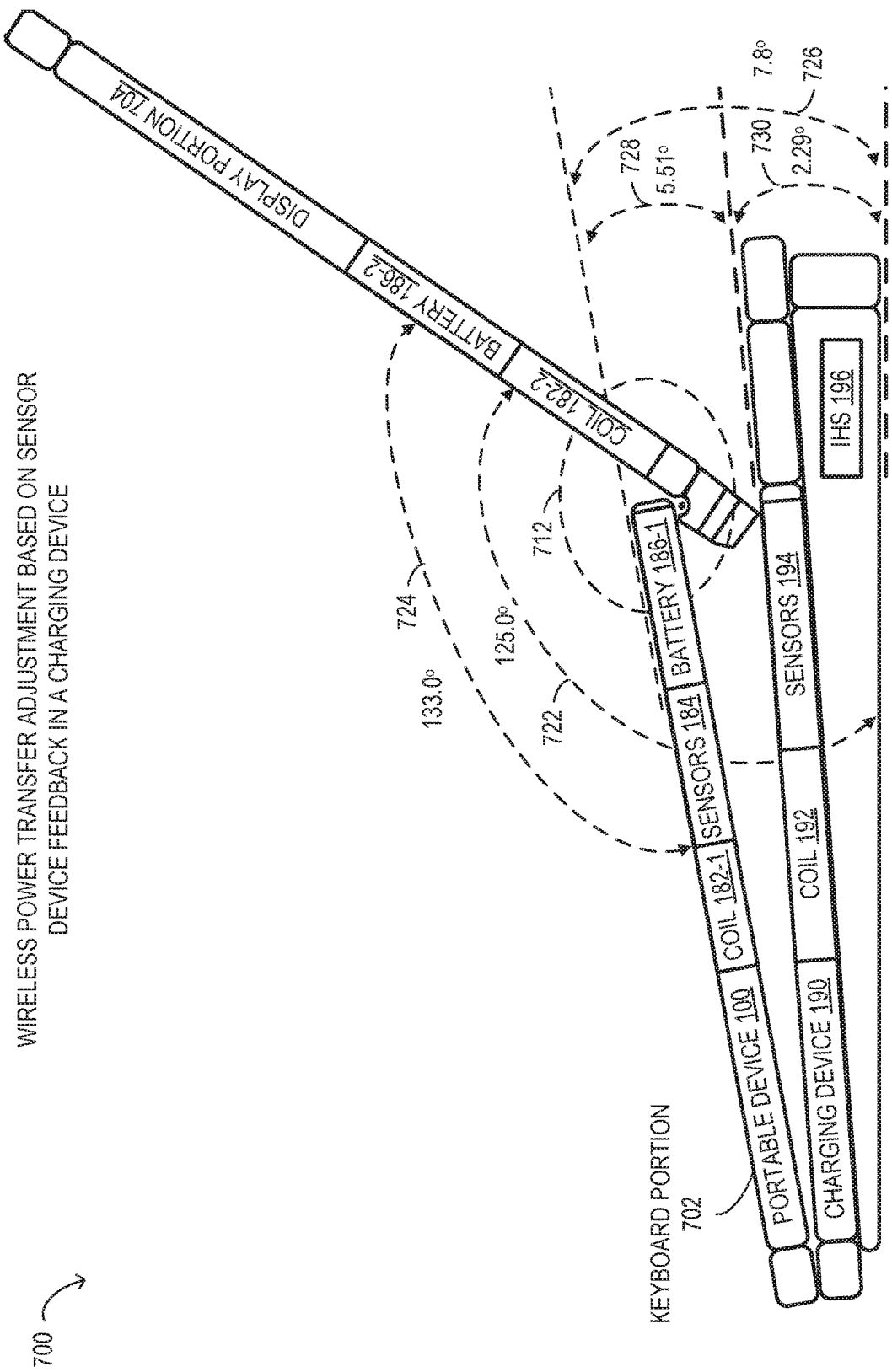
FIGS. 7A and 7B are perspective views of embodiments a charging device and a portable device including wireless power transfer adjustments based on sensor device feedback.
Figure 7B:
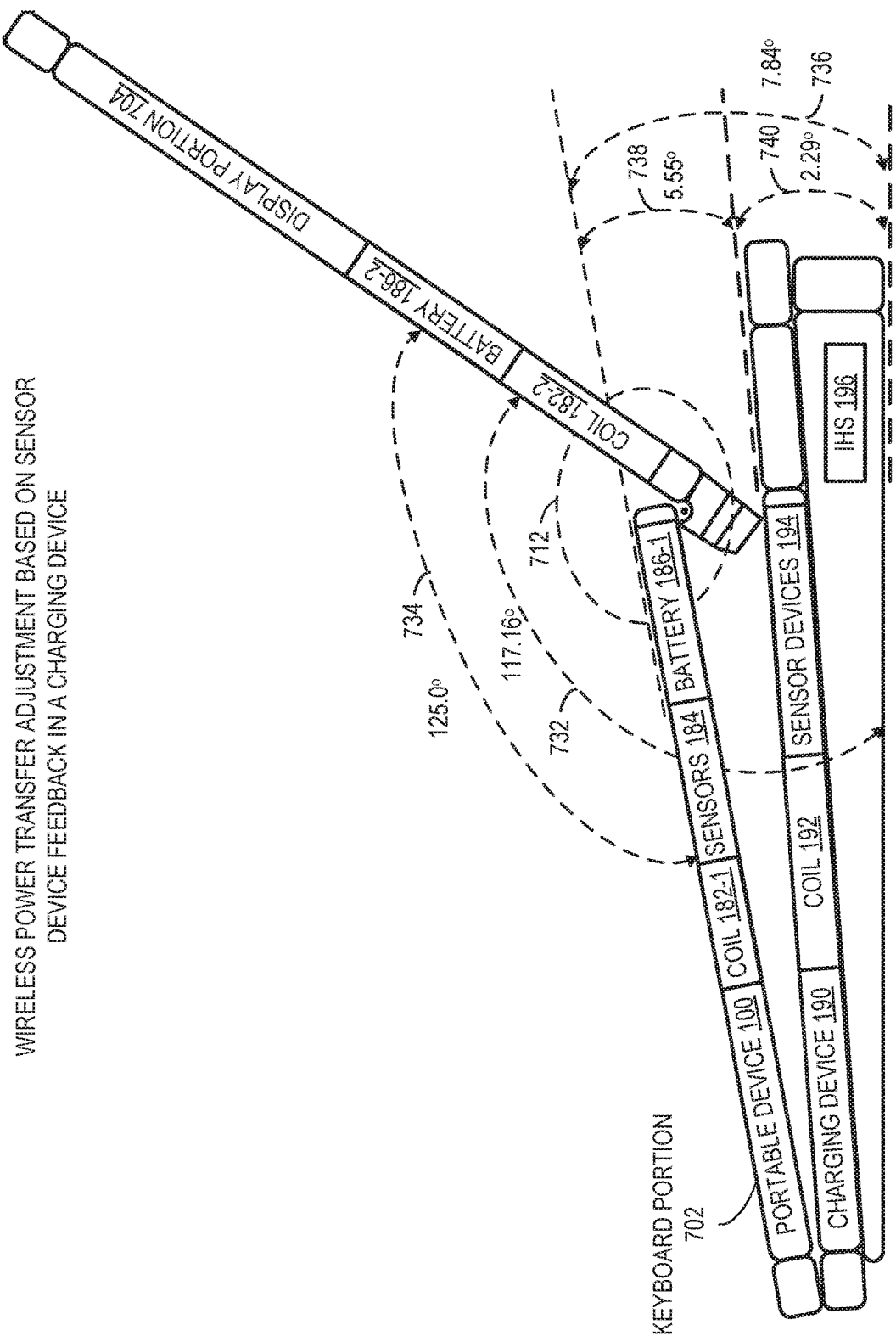

Turning now to FIGS. 7A and 7B, are perspective views 500 of embodiments of charging device 190 and a portable device 100 for wireless power transfer adjustments based on sensor device feedback. Portable device 100 may be portable information handling system 100. In FIGS. 7A and 7B, charging device 190 and portable device 100 are shown in a schematic representation and are not drawn to scale or perspective. It is noted that, in different embodiments, charging device 190 and a portable device 100 may be operated with additional or fewer elements.

As shown in FIG. 7A, portable device 100 may include a keyboard portion 702 and a display portion 704. The first charging surface of lid housing portion 202 of charging device 190 may be at an inclined angle 730 based on the design of charging device 190. For example, inclined angle 730 between main housing portion 204 and the first charging surface is shown as 2.29°. Portable device 100 may also have a gap angle 728 between the second charging surface of keyboard portion 702 and the first charging surface of charging device 190 that is based on the position and placement of portable device 100 on the first charging surface. Gap angle 728 may be caused by a hinge area 712 of display portion 704 contacting the first charging surface in such a way that hinge area 712 of the second charging surface of portable device 100 does not contact the first charging surface, when display portion 704 is in an open angle position 724 from the second charging surface. As shown, gap angle 728 is 5.51°, open angle position 724 is 133.0°, an angle 722 between display portion 704 at open angle position 724 of 133.0° is 125.0°, and an angle 726 between main housing portion 204 and the second charging surface is 7.8°. Inclined angle 730, gap angle 728, open angle position 724, angle 722, and angle 726 may vary between 0° and 180° or more based on the relative positions of portable device 100, display portion 704, and charging device 190. Similarly, FIG. 7A shows portable device 100 and charging device 190 in different angles relative to each other. In FIG. 7B, a gap angle 738 is 5.55°, an open angle position 734 is 125.0°, an angle 732 between display portion 704 at open angle position 734 of 125.0° is 117.16°, and an angle 736 between main housing portion 204 and the second charging surface is 7.84°. In the examples of FIGS. 7A and 7B, there is not a large deviation of tilt angle, angles 726 and 736, even when open angle position 734 is increased 7° more than open angle position 724, which may indicate that the impact due to the relative angles between portable device 100 and charging device 190 may be minimal and may require less active length adjustment of induction coil 192.

The processor of charging device 190 may collect sensor feedback information from sensors 184 and sensors 194. The processor may also determine, based on the sensor feedback information, the relative distance between the first charging surface and the second charging surface, the relative position of portable device 100 on the first charging surface, the proximity of the second charging surface to the first charging surface, and relative angles between each of portable device 100, display portion 704, and charging device 190. The processor may determine a charging efficiency of induction coil 192 based on the determined relative distance, the relative position, the proximity, and the relative angles of charging device 190 and portable device 100. The processor may also determine an adjusted active length of induction coil 192 that may be based on the determined charging efficiency. The processor may further electronically switch the active length of induction coil 192 to the determined adjusted active length to compensate for the determined relative distance, the relative position, the proximity, and the relative angles of charging device 190 and portable device 100.

The processor of charging device 190 may request battery information from portable device 100. The processor may determine that a second battery 186-2 may be charged based on the battery information received from portable device 100. The processor of charging device 190 may also collect sensor feedback information from sensors 184 and sensors 194 to determine, based on the sensor feedback information, a second relative distance between the first charging surface and the position of a third induction coil 182-2 of display portion 704, a second relative position of display portion 704 of portable device 100 on the first charging surface, a second proximity of display portion 704 of portable device 100 to the first charging surface, and second relative angles between each of portable device 100, display portion 704, and charging device 190. This determination may take into account that the third induction coil 182-2 will be utilized to transfer power wirelessly from charging device 190 to portable device 100. The processor may also determine a second charging efficiency of induction coil 192 to charge battery 186-2 based on the battery information, the determined second relative distance, the second relative position, the second proximity, and the second relative angles of charging device 190 and portable device 100. The processor may further determine a second adjusted active length of induction coil 192 based on the determined second charging efficiency. The processor may also electronically switch the active length of induction coil 192 to the determined second adjusted active length. The processor may further transmit the power wirelessly to portable device 100 to charge the second battery 186-2 by coupling induction coil 182-1 and the third induction coil 182-2 of portable device 100 to transmit power wirelessly to portable device 100.

In one or more embodiments, the processor may determine that the active length of induction coil 192 is to remain the same active length based on a temperature of the first battery 186-1 and a usage level of the first battery 186-1. When the temperature of the first battery 186-1 may indicate that the first battery 186-1 may exceed a temperature threshold (it is too hot) or a usage level of the first battery 186-1 may be at a heavy usage level, the processor may transfer power using a lower charging efficiency of induction coil 192 to charge the first battery 186-1 and prevent overheating the first battery 186-1. When the temperature of the second battery 186-2 may indicate that the second battery 186-2 exceeds a temperature threshold (it is too hot) or a usage level of the second battery 186-2 may be at a heavy usage level, the processor may transfer power using a lower charging efficiency of induction coil 192 to charge the second battery 186-2 and prevent overheating the second battery 186-2. The processor may also use a lower charging efficiency of induction coil 192 by transferring power wirelessly using the second induction coil 182-1 to charge the second battery 186-2 or transferring power wirelessly using the third induction coil 182-2 to charge the first battery 186-2.

Figure 8:
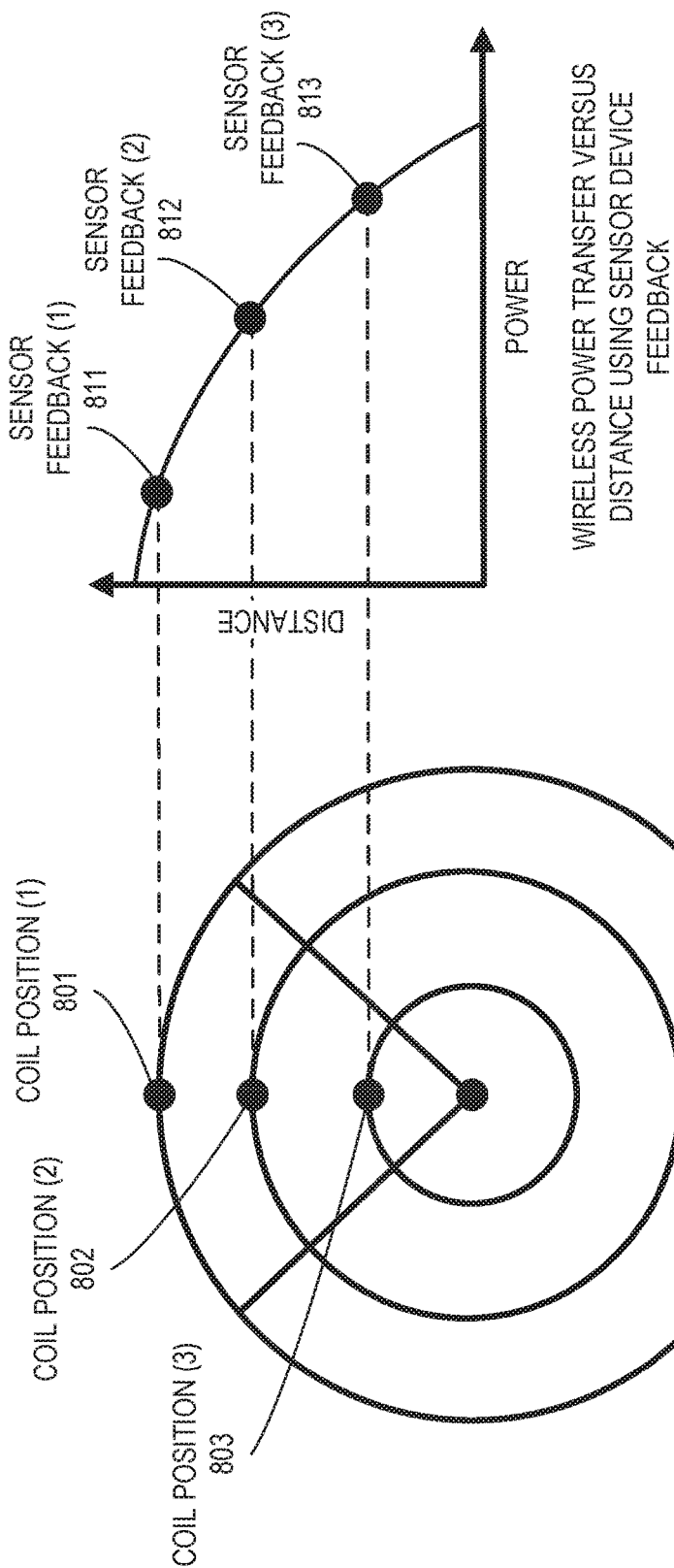
FIG. 8 is an illustration of coil efficiency optimization based on a position of a portable device relative to a charging device.

Turning now to FIG. 8, is an illustration of induction coil efficiency optimization based on a position of portable device 100 relative to charging device 190. Induction coil efficiency optimization may utilize different discrete active lengths of induction cable 192 of portable device 100 to find an optimal active length of induction cable 192. As shown in FIG. 8, three active lengths of induction cable 192, a coil position 801 (1), a coil position 802 (2), and a coil position 803 (3), are considered. The processor of charging device 190 may utilize a recursive algorithm to detect a coil efficiency loss at each of a plurality of discrete steps. The number of discrete steps may be based on the number of turns in induction coil 192, which may be 3D induction coil 692. At each discrete step, the processor may: electronically switch the active length of induction coil 192 to the discrete adjusted active length, collect sensor feedback information from sensors 184 and 194 for induction coil 192 having the discrete adjusted active length, and determine the efficiency loss for induction coil 192 having the discrete adjusted active length. As shown in FIG. 8, the first discrete evaluation step may be coil position 801 (1), sensor feedback information may be sensor feedback 811 (1), and the first determined efficiency loss may be based on sensor feedback 811. Similarly, the second and third discrete evaluation steps may be coil positions 802 (2) and 803 (3), sensor feedback information may be sensor feedback 812 (2) and 813 (3), and the second and third determined efficiency losses may be based on sensor feedback 812 and 813 respectively. The processor may determine which of each of the discrete evaluation steps yields the least efficiency loss. The processor may adjust the active length of induction cable 192 to the discrete adjusted active length having the least efficiency loss.

Figure 9:
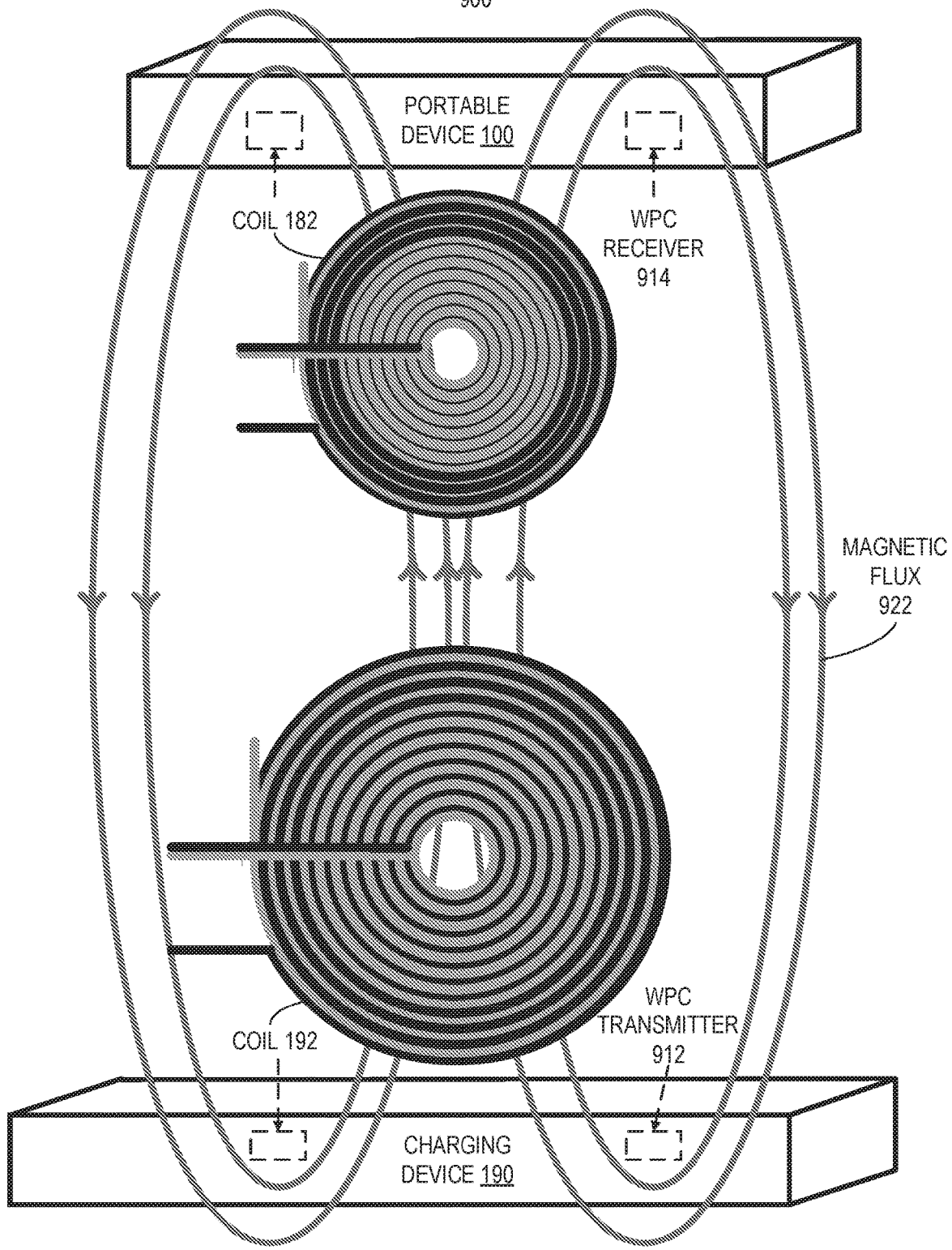
FIG. 9 is a block diagram of selected elements of an embodiment of wireless power transmission using an adjustable length coil in a charging device.

Turning now to FIG. 9, is a block diagram of selected elements of an embodiment of wireless power transmission using an adjustable length coil in charging device 100. Charging device 190 may include a wireless power consortium (WPC) transmitter 912 to transmit power wirelessly and portable device 100 may include a WPC receiver 914 to receive power wirelessly. The direction of magnetic flux 922 is shown when charging device 190 is transmitting power wirelessly to portable device 100 using adjustable length induction coil 192 coupled to induction coil 182.

Figure 10:
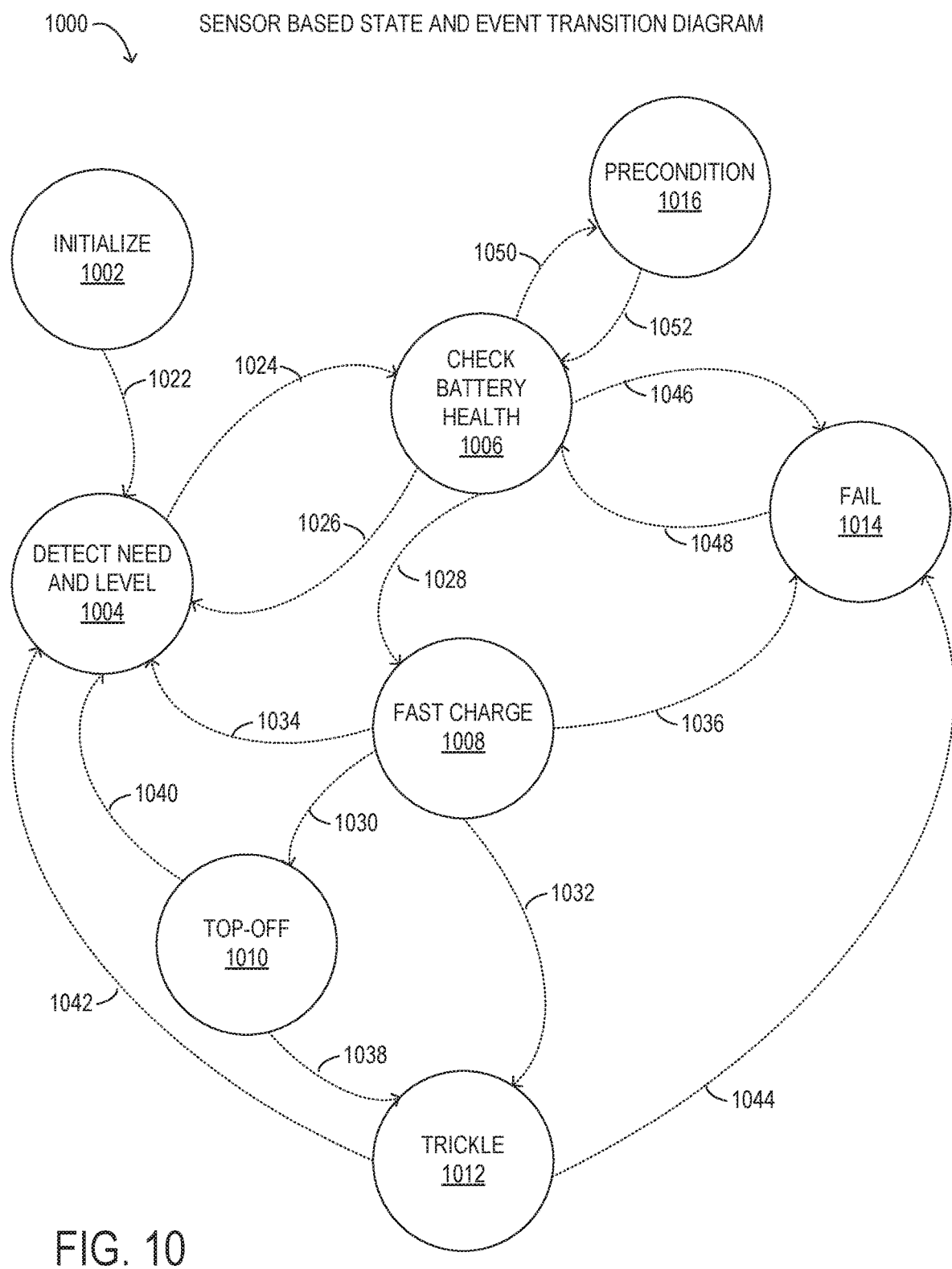
FIG. 10 is a sensor based charging device state and event transition diagram.

FIG. 10 is a sensor based charging device state and event transition diagram 1000. Charging device 190 may start at an initialization state 1002. At state 1002, charging device 190 may detect portable device 100 in contact to a first charging surface of charging device 190 and transition to a detect need and level state 1004 via 1022. At state 1004, the processor may determine a power transmission need and battery levels of portable device 100 and may transition to state 1006 via 1024. At state 1006, the processor may check the health of battery 186. At state 1006, when the health of battery 186 indicates that the battery may be healthy and at a fully charged level, the processor may transition back to state 1004 via 1026. At state 1006, when the health of battery 186 indicates that the battery may not be healthy or may have failed, the processor may transition to state 1014 via 1046. At state 1014, the heath of battery 186 may be restored and the processor may transition back to state 1006 via 1048. At state 1006, when the health of battery 186 indicates that the battery may require preconditioning, the processor may transition to state 1016 via 1050. At state 1016, battery 186 may be preconditioned and the processor may transition back to state 1006 via 1052. At state 1006, when the health of battery 186 indicates that battery 186 may need a fast charge, the processor may transition to state 1008 via 1028. At state 1008, battery 186 may be charged using a fast charge. At state 1008, when battery 186 indicates that that the battery may not be healthy or may have failed, the processor may transition to state 1014 via 1036. At state 1008, when battery 186 indicates that it is at the fully charged level, the processor may transition to state 1004 via 1034. At state 1008, when the battery 186 indicates that battery 186 may have reached a top-off transition charge level, the processor may transition to state 1010 via 1030. At state 1008, when the battery 186 indicates that battery 186 may have reached a trickle transition charge level, the processor may transition to state 1012 via 1032. At state 1010, when the battery 186 indicates that battery 186 may have reached a top-off charge level, the processor may transition to state 1004 via 1040. At state 1010, when the battery 186 indicates that battery 186 may have reached a trickle transition charge level, the processor may transition to state 1012 via 1038. At state 1012, when battery 186 indicates that that the battery may not be healthy or may have failed, the processor may transition to state 1014 via 1044. At state 1012, when battery 186 indicates that it is at the fully charged level, the processor may transition to state 1004 via 1042.

Figure 11:
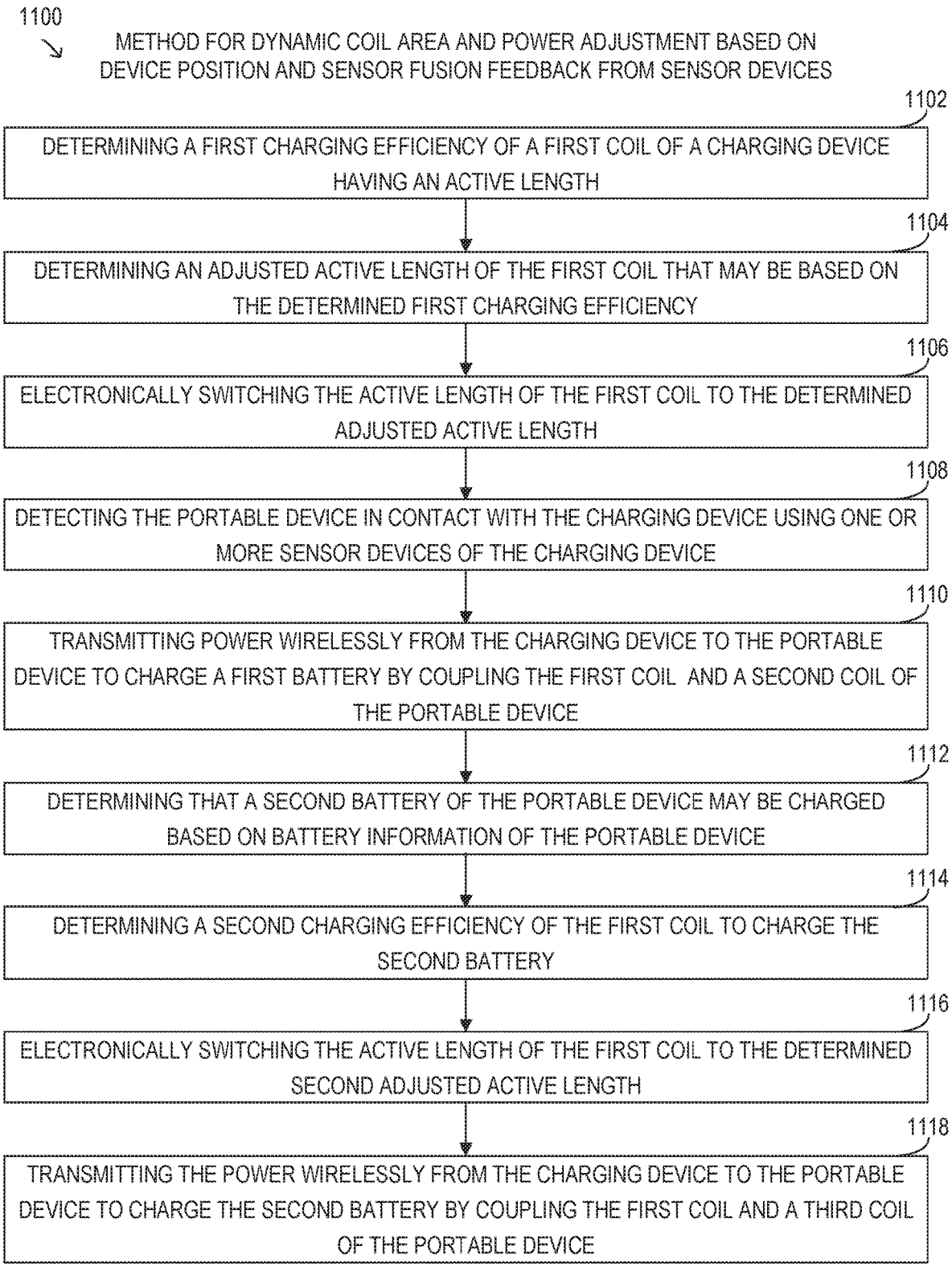
FIG. 11 is a flow chart of selected elements of a method for dynamic coil area and power adjustment based on device position and sensor fusion feedback from sensor devices.

Referring now to FIG. 11, a flow chart of selected elements of a method 1100 for dynamic coil area and power adjustment based on device position and sensor fusion feedback from sensor devices, as described herein, is depicted in flowchart form. Method 1100 may be performed using charging device 190 (see FIGS. 1, 2, 3, 5A, 5B, and 9) and, in particular, by charging device 190, induction coil 192, and sensors 194. It is noted that certain operations described in method 1100 may be optional or may be rearranged in different embodiments.

Method 1100 may begin at step 1102, by determining, by a processor of a charging device, a first charging efficiency of a first induction coil of the charging device having an active length. The active length of the first induction coil may be adjustable. At step 1104, determining, by the processor, an adjusted active length of the first induction coil that may be based on the determined first charging efficiency. At step 1106, electronically switching, by the processor, the active length of the first induction coil to the determined adjusted active length. At step 1108, detecting the portable device in contact with the charging device using one or more sensor devices of the charging device. The one or more sensor devices may include a track sensor device, a proximity sensor device, a touch sensor device, an optical sensor device, a thermal sensor device, and a specific absorption rate sensor device. At step 1110, transmitting, by the processor, power wirelessly from the first induction coil of the charging device to the portable device having a second induction coil to charge a first battery of the portable device. The power may be transmitted wirelessly by coupling the first induction coil of the charging device and the second induction coil of the portable device. At step 1112, determining that a second battery of the portable device may be charged based on battery information of the portable device received from the portable device. At step 1114, determining a second charging efficiency of the first induction coil to charge the second battery. The method may also include determining a second adjusted active length of the first induction coil that may be based on the determined second charging efficiency. At step 1116, electronically switching the active length of the first induction coil to the determined second adjusted active length. At step 1118, transmitting the power wirelessly from the charging device to the portable device to charge the second battery. The power may be transmitted wirelessly by coupling the first induction coil of the charging device and a third induction coil of the portable device.

As disclosed herein, systems and methods for dynamic coil area and power adjustment based on device position and sensor fusion feedback from touch, optical, Bluetooth, and specific absorption rate sensor devices may include a charging device that may include a first induction coil having an active length and a processor. The charging device may transmit power wirelessly to a portable device having a second induction coil by coupling the first induction coil and the second induction coil. The charging device may determine an adjusted active length of the first induction coil that may be based on a first charging efficiency of the first induction coil. The processor may electronically switch the active length of the first induction coil to the determined adjusted active length. The processor may transmit the power wirelessly to the portable device to charge a first battery of the portable device.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A charging device, comprising:
   a first induction coil having an active length and configured to transmit power wirelessly to a portable device having a second induction coil by coupling the first induction coil and the second induction coil, wherein the first induction coil is a double wound induction coil including a first inner induction coil having a first length and a second inner induction coil having a second length, and wherein the active length is adjustable; and
   a processor configured to:
      determine a first charging efficiency of the first induction coil;
      determine an adjusted active length of the first induction coil based on the determined first charging efficiency;
      electronically switch the active length of the first induction coil to the determined adjusted active length, wherein the processor electronically switches the active length of the first induction coil by electronically switching between utilizing the first inner induction coil having the first length and utilizing the second inner induction coil having the second length; and
      transmit the power wirelessly from the first induction coil to the portable device to charge a first battery of the portable device.

2. The charging device of claim 1, wherein the first induction coil has a flat shape.

3. The charging device of claim 1, wherein the first induction coil has a convex shape so that the center of the first induction coil is closer to a charging pad of the charging device than the perimeter of the first induction coil.

4. The charging device of claim 1, wherein the first induction coil is a three dimensional induction coil having a successive plurality of links including a first link, each of the successive plurality of links having a plurality of turns and an electrical connection to a next link in the succession of the plurality of links after the first link, and wherein the processor electronically switches the active length of the first induction coil by electronically switching the electrical connection of the first link to disconnect the first link from the next link and set the active length of first induction coil to a total length of the first link and all previous links in the succession of the plurality of links before the first link.

5. The charging device of claim 1, the charging device further comprising:
   one or more sensor devices configure to detect the portable device in contact with the charging device; and
   the processor further configured to detect the portable device using the one or more sensor devices, wherein the one or more sensor devices include at least one of:
      a track sensor device;
      a proximity sensor device;
      a touch sensor device;
      an optical sensor device;
      a thermal sensor device; and
      a specific absorption rate sensor device.

6. The charging device of claim 1, the processor further configured to:
   determine that a second battery of the portable device is to be charged based on battery information of the portable device received from the portable device;
   determine a second charging efficiency of the first induction coil to charge the second battery;
   determine a second adjusted active length of the first induction coil based on the determined second charging efficiency;
   electronically switch the active length of the first induction coil to the determined second adjusted active length; and
   transmit the power wirelessly to the portable device to charge the second battery, wherein the first induction coil further configured to couple the first induction coil and a third induction coil of the portable device to transmit power wirelessly to the portable device.

7. The charging device of claim 1, wherein the processor further configured to:
   determine a relative distance between a first charging surface of the charging device and a second charging surface of the portable device;
   determine a position of the portable device on the first charging surface;
   determine a temperature of the first induction coil;
   determine an angle of the second charging surface of the portable device to the first charging surface;
   determine a proximity of the second charging surface of the portable device to the first charging surface; and
   determine a loss of the charging efficiency of the charging device based on:
      the relative distance between the first charging surface and the second charging surface;
      the position of the portable device on the first charging surface;
      the temperature of the first induction coil;
      the angle of the second charging surface to the first charging surface;
      the proximity of the second charging surface to the first charging surface;
      battery information of the portable device received from the portable device; and
      an eddy current of the first induction coil.

8. The charging device of claim 7, wherein the battery information of the portable device includes at least one of:
   a battery charging priority;
   a charge level of the first battery;
   a charging efficiency of the first battery;
   a health of the first battery;
   a temperature of the first battery;
   a usage level of the first battery;
   a charge level of a second battery of the portable device;
   a charging efficiency of the second battery;
   a health of the second battery;
   a temperature of the second battery; and
   a usage level of the second battery.

9. The charging device of claim 1, wherein the first charging efficiency of the first induction coil is based on at least one of:
   a relative position of the second induction coil of the portable device to the first induction coil of the charging device;

a relative distance between the first charging surface and a second charging surface of the portable device;
an angle of the second charging surface of the portable device to the first charging surface;
proximity of the second charging surface of the portable device to the first charging surface;
a temperature of the first induction coil; and
an eddy current of the first induction coil.

10. A method, comprising:
determining, by a processor of a charging device, a first charging efficiency of a first induction coil of the charging device having an active length, wherein the first induction coil is a double wound coil including a first inner induction coil having a first length and a second inner induction coil having a second length, and wherein the active length of the first induction coil is adjustable;
determining, by the processor, an adjusted active length of the first induction coil based on the determined first charging efficiency;
electronically switching, by the processor, the active length of the first induction coil to the determined adjusted active length, wherein the processor electronically switches the active length of the first induction coil by electronically switching between utilizing the first inner induction coil having the first length and utilizing the second inner induction coil having the second length; and
transmitting, by the processor, power wirelessly from the first induction coil of the charging device to the portable device having a second induction coil to charge a first battery of the portable device, wherein the power is transmitted wirelessly by coupling the first induction coil of the charging device and the second induction coil of the portable device.

11. The method of claim 10, wherein the first induction coil has a flat shape.

12. The method of claim 10, wherein the first induction coil has a convex shape so that the center of the first induction coil is closer to a charging pad of the charging device than the perimeter of the first induction coil.

13. The method of claim 10, wherein the first induction coil is a three dimensional coil having a successive plurality of links including a first link, each of the successive plurality of links having a plurality of turns and an electrical connection to a next link in the succession of the plurality of links after the first link, and wherein the processor electronically switches the active length of the first induction coil by electronically switching the electrical connection of the first link to disconnect the first link from the next link and set the active length of first induction coil to a total length of the first link and all previous links in the succession of the plurality of links before the first link.

14. The method of claim 10, further comprising:
detecting the portable device in contact with the charging device using one or more sensor devices of the charging device, wherein the one or more sensor devices include at least one of:
a track sensor device;
a proximity sensor device;
a touch sensor device;
an optical sensor device;
a thermal sensor device; and
a specific absorption rate sensor device.

15. The method of claim 10, further comprising:
determining that a second battery of the portable device is to be charged based on battery information of the portable device received from the portable device;
determining a second charging efficiency of the first induction coil to charge the second battery;
determining a second adjusted active length of the first induction coil based on the determined second charging efficiency;
electronically switching the active length of the first induction coil to the determined second adjusted active length; and
transmitting the power wirelessly from the charging device to the portable device to charge the second battery, wherein the power is transmitted wirelessly by coupling the first induction coil of the charging device and a third induction coil of the portable device.

16. The method of claim 10, further comprising:
determining a relative distance between a first charging surface of the charging device and a second charging surface of the portable device;
determining a position of the portable device on the first charging surface;
determining a temperature of the first induction coil;
determining an angle of the second charging surface of the portable device to the first charging surface;
determining proximity of the second charging surface of the portable device to the first charging surface; and
determining a loss of the charging efficiency of the charging device based on:
the relative distance between the first charging surface and the second charging surface;
the position of the portable device on the first charging surface;
the temperature of the first induction coil;
the angle of the second charging surface to the first charging surface;
the proximity of the second charging surface to the first charging surface;
battery information of the portable device received from the portable device; and
an eddy current of the first induction coil.

17. The method of claim 16, wherein the battery information of the portable device includes at least one of:
a battery charging priority;
a charge level of the first battery;
a charging efficiency of the first battery;
a health of the first battery;
a temperature of the first battery;
a usage level of the first battery;
a charge level of a second battery of the portable device;
a charging efficiency of the second battery;
a health of the second battery;
a temperature of the second battery; and
a usage level of the second battery.

18. The method of claim 10, wherein the first charging efficiency of the first induction coil is based on at least one of:
a relative position of the second induction coil of the portable device to the first induction coil of the charging device;
a relative distance between the first charging surface and a second charging surface of the portable device;
an angle of the second charging surface of the portable device to the first charging surface;
proximity of the second charging surface of the portable device to the first charging surface;
a temperature of the first induction coil; and
an eddy current of the first induction coil.

* * * * *